(12) United States Patent
Fan et al.

(10) Patent No.: US 10,481,294 B2
(45) Date of Patent: Nov. 19, 2019

(54) INSPECTION SYSTEM

(71) Applicant: NUCTECH COMPANY LIMITED, Beijing (CN)

(72) Inventors: Xuping Fan, Beijing (CN); Quanwei Song, Beijing (CN); Zhiqiang Chen, Beijing (CN); Shangmin Sun, Beijing (CN)

( * ) Notice: Subject to any disclaimer, the term of this patent is extended or adjusted under 35 U.S.C. 154(b) by 65 days.

(21) Appl. No.: 15/727,637

(22) Filed: Oct. 9, 2017

(65) Prior Publication Data

US 2018/0149767 A1 May 31, 2018

(30) Foreign Application Priority Data

Nov. 25, 2016 (CN) .......................... 2016 1 1056418

(51) Int. Cl.
*G01V 5/00* (2006.01)

(52) U.S. Cl.
CPC .......... *G01V 5/0066* (2013.01); *G01V 5/0008* (2013.01)

(58) Field of Classification Search
CPC .................................................. G01V 5/0066
See application file for complete search history.

(56) References Cited

U.S. PATENT DOCUMENTS

2003/0085192 A1 5/2003 Lopez Alba

FOREIGN PATENT DOCUMENTS

| CN | 2632671 Y | 8/2004 | |
|---|---|---|---|
| CN | 101284636 A | 10/2008 | |
| CN | 201440131 U | 4/2010 | |
| CN | 101953234 A | 1/2011 | |
| CN | 103243647 A | 8/2013 | |
| CN | 204086172 U | 1/2015 | |
| CN | 106371146 A | 2/2017 | |
| CN | 206440842 U | 8/2017 | |
| EP | 2990371 A1 | 3/2016 | |
| FR | 2836468 B1 | 3/2008 | |
| WO | WO-2009088706 A2 * | 7/2009 | ........... G01V 5/0008 |

* cited by examiner

*Primary Examiner* — Kenneth J Malkowski
(74) *Attorney, Agent, or Firm* — Kilpatrick Townsend & Stockton, LLP

(57) ABSTRACT

The present invention relates to an inspection system. The inspection system comprises a base, a boom lifting mechanism provided on the base, and a boom mounting a detector. The boom lifting mechanism includes at least two support arms arranged sequentially. The at least two support arms include a base arm and a distal arm. The base arm is connected to the base, the boom is mounted on the distal arm, the inspection system has a scanning state and a transporting state, and two adjacent support arms of the at least two support arms are rotatably connected so that the height of the boom in the scanning state is different from that in the transporting state. The boom lifting mechanism of the inspection system of the present invention lifts the boom by rotatably connecting two adjacent support arms, and presents less required driving force compared to the lifting of the boom directly in a vertical direction in the prior art. Thus, there is less weight of the driving mechanism for driving the lifting of the boom, so as to reduce the self-weight of the inspection system.

10 Claims, 3 Drawing Sheets

INSPECTION SYSTEM

CROSS-REFERENCES TO RELATED APPLICATIONS

The present application claims the priority to Chinese Patent Application No. 201611056418.X, titled "INSPECTION SYSTEM", filed on Nov. 25, 2016 with the State Intellectual Property Office of the PRC, which is incorporated herein by reference in its entirety.

FIELD OF THE INVENTION

The present application relates to the technical field of radiation detection, and more particularly relates to an inspection system.

BACKGROUND OF THE INVENTION

As shown in FIGS. 1 and 2, the inspection system in the prior art comprises a sleeve 1', a post 3' and a boom 2' mounting a detector. When the inspection system is in a scanning state, it is necessary to lift the boom 2'. When the inspection system is in a transporting state, it is necessary to lower the boom 2'.

The inspection system in the prior art accomplishes the lifting and lowering of the boom 2' by cooperating the sleeve 1' with the post 3'. It can be seen that the inspection system in the prior art when hoisting the boom 2', directly hoists the boom 2' in a vertical direction, with a greater required driving force, and a larger volume and weight of the driving mechanism, so that there may be a greater self-weight of the inspection system.

SUMMARY OF THE INVENTION

The object of the present application is to provide an inspection system, to reduce the self-weight of the inspection system.

The present application provides an inspection system, comprising a base, a boom lifting mechanism provided on the base and a detector mounting boom, the boom lifting mechanism including at least two support arms arranged sequentially, the at least two support arms including a base arm and a distal arm, the base arm being connected to the base, the boom being mounted on the distal arm, the inspection system having a scanning state and a transporting state, two adjacent support arms of the at least two support arms being rotatably connected so that the height of the boom in the scanning state is different from that in the transporting state.

Further, the base arm is rotatably disposed on the base.

Further, the boom lifting mechanism comprises a first drive mechanism for driving the base arm to rotate relative to the base.

Further, the first drive mechanism comprises a first hydraulic cylinder, one of the cylinder block and the piston rod of the first hydraulic cylinder being connected to the base, the other one of the cylinder block and the piston rod of the first hydraulic cylinder being connected to the base arm.

Further, the distal arm is rotatably disposed on the base arm.

Further, the boom lifting mechanism comprises a second drive mechanism for driving the distal arm to rotate.

Further, the second drive mechanism comprises a second hydraulic cylinder, one of the cylinder block and the piston rod of the second hydraulic cylinder being connected to the base arm or the base, the other of the cylinder block and the piston rod of the second hydraulic cylinder being connected to the distal arm.

Further, the boom comprises a first detection arm and a second detection arm rotatably provided on the first detection arm; wherein when the inspection system is in a scanning state, the first detection arm is horizontally arranged and the second detection arm is vertically arranged, and the boom lifting mechanism, the first detection arm and the second detection arm jointly constituting a door-shaped structure; when the inspection system is in a transporting state, the second detection arm is in the same direction as the first detection arm by rotation relative to the first detection arm, and the first detection arm and the second detection arm are both horizontally arranged.

Further, the inspection system comprises a scanning vehicle, on which the base is disposed.

Further, the base includes a revolving platform rotatably provided on the scanning vehicle, the boom lifting mechanism being disposed on the revolving platform.

Further, the detection arms comprise a first detection arm provided on the boom and a second detection arm rotatably provided on the first detection arm, wherein when the inspection system is in the scanning state, the first detection arm is horizontally arranged and the second detection arm is vertically arranged, the boom lifting mechanism, the first detection arm and the second detection arm jointly constitute a door-shaped structure provided transversely outside the scanning vehicle as the revolving platform drives the boom lifting mechanism to rotate relative to the scanning vehicle along a first direction so that; when the inspection system is in the transporting state, the second detection arm is in the same direction as the first detection arm by rotation relative to the first detection arm, and the first detection arm and the second detection arm are both horizontally arranged, the first detection arm and the second detection arm are disposed the scanning vehicle after said boom lifting mechanism being driven by said revolving platform to rotate relative to the scanning vehicle along a second direction opposite to the first direction.

The inspection system provided on the basis of the present application comprises a base, a boom lifting mechanism provided on the base, and a boom mounting a detector. The boom lifting mechanism includes at least two support arms arranged sequentially. The at least two support arms include a base arm and a distal arm. The base arm is connected to the base, the boom is mounted on the distal arm, the inspection system has a scanning state and a transporting state, and two adjacent support arms of the at least two support arms are rotatably connected so that the height of the boom in the scanning state is different from that in the transporting state. The boom lifting mechanism of the inspection system of the present application lifts the boom by rotatably connecting two adjacent support arms, and presents less required driving force compared to the lifting of the boom directly in a vertical direction in the prior art. Thus, there is less weight of the driving mechanism for driving the lifting of the boom, so as to reduce the self-weight of the inspection system.

Other features of the present application and advantages thereof will become explicit by means of the following detailed descriptions of exemplary embodiments of the present application with reference to the drawings.

BRIEF DESCRIPTION OF THE ACCOMPANYING DRAWINGS

The drawings described herein are used to provide a further understanding of the present application and constitute a part of the present application. The illustrative embodiments of the present application as well as the descriptions thereof, which are used for explaining the present application, do not constitute improper definitions on the present application. In the drawings.

Figure 1:
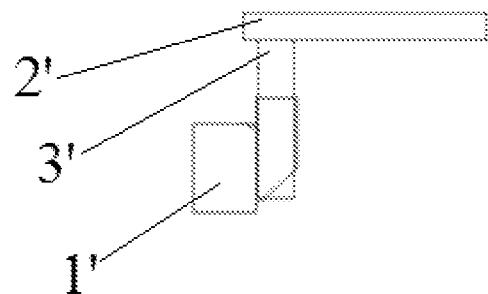
FIG. 1 is a schematic view of the structure of the inspection system of the prior art in a scanning state.
Figure 2:
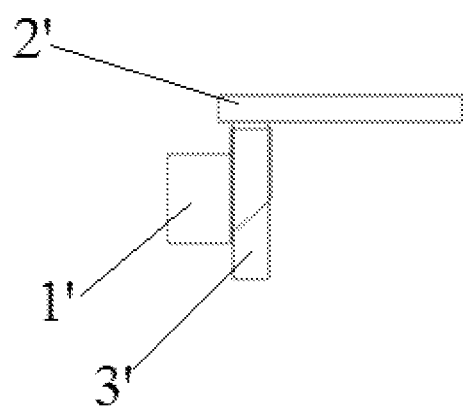
FIG. 2 is a schematic view of the structure of the inspection system as shown in FIG. 1 in a transporting state.

Various reference signs respectively represent: 1'—sleeve; 2'—boom; 3'—post; 1—base; 2—boom; 21—first detection arm; 22—second detection arm; 3—boom lifting mechanism; 31—base arm; 32—distal arm; 33—first hydraulic cylinder; 34—second hydraulic cylinder.

DETAILED DESCRIPTION OF THE PREFERRED EMBODIMENTS

Next, the technical solution in the embodiments of the present invention will be explicitly and completely described in combination with the drawings in the embodiments of the present invention. Apparently, the described embodiments are merely part of the embodiments of the present invention, rather than all the embodiments. The following descriptions of at least one exemplary embodiment which are in fact merely descriptive, by no means serve as any delimitation on the present invention as well as its application or use. On the basis of the embodiments of the present invention, all the other embodiments acquired by a person skilled in the art on the premise that no inventive effort is involved fall into the protection scope of the present invention.

Unless additionally specified, the relative arrangements, numerical expressions and numerical values of the components and steps expounded in these examples do not limit the scope of the present invention. At the same time, it should be understood that, in order to facilitate the description, the dimensions of various parts shown in the drawings are not delineated according to actual proportional relations. The techniques, methods, and apparatuses known to a common technical person in the relevant art may not be discussed in detail, but where appropriate, techniques, methods, and apparatuses should be considered as part of the granted description. Among all the examples shown and discussed here, any specific value should be construed as being merely illustrative, rather than as a delimitation. Thus, other examples of exemplary embodiments may have different values. It should be noted that similar reference signs and letters present similar items in the following drawings, and therefore, once an item is defined in a drawing, there is no need for further discussion in the subsequent drawings.

The embodiments of the present application only exemplifies a vehicle mounted radiation inspection system to describe the inspection system of the present application, which is preferably used for a mobile inspection system represented by a vehicle mounted radiation inspection system, but may be used on a fixed inspection system in the case that a mobile device such as a scanning vehicle is not provided.

The inspection system comprises a base, a boom lifting mechanism provided on the base, and a detector mounting boom. The boom lifting mechanism includes at least two support arms arranged sequentially. The at least two support arms include a base arm and a distal arm. The base arm is connected to the base, the boom is mounted on the distal arm, the inspection system has a scanning state and a transporting state, and two adjacent support arms of the at least two support arms are rotatably connected so that the height of the boom in the scanning state is different from that in transporting state.

The boom lifting mechanism of the inspection system of the embodiments of the present application lifts the boom by rotatably connecting two adjacent support arms, and presents less required driving force compared to the lifting of the boom directly in a vertical direction in the prior art. Thus, there is less weight of the driving mechanism for driving the lifting of the boom, so as to reduce the self-weight of the inspection system.

Figure 3:
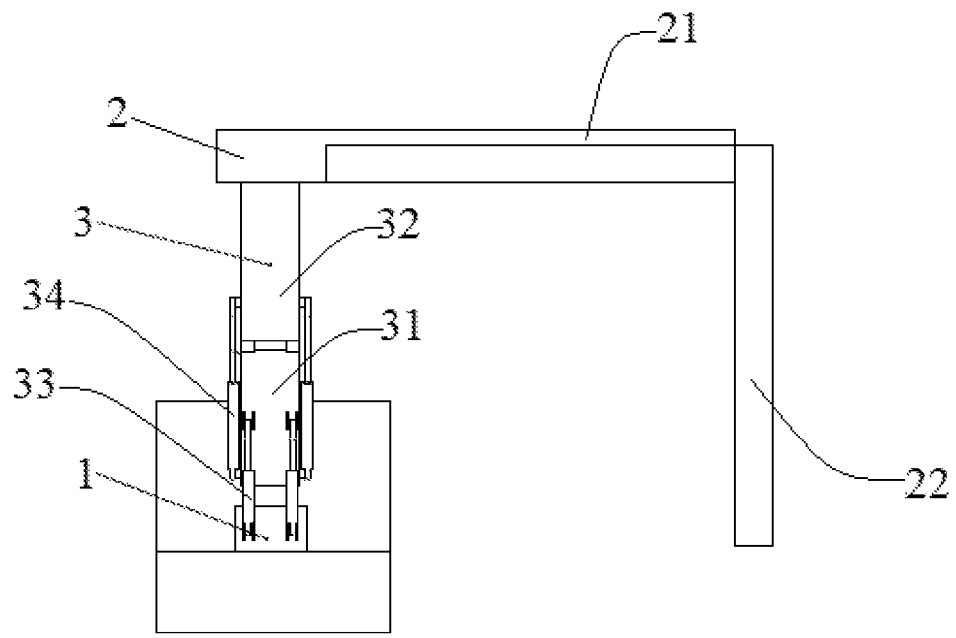
FIG. 3 is a schematic view of a front view structure of the inspection system of the embodiments of the present application in a scanning state.
Figure 4:
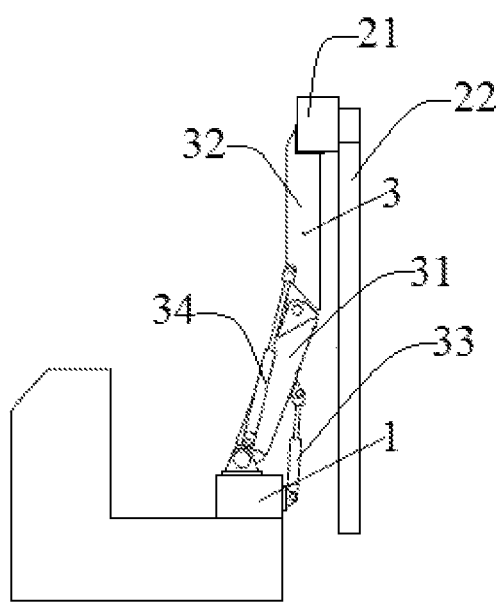
FIG. 4 is a schematic view of the side view structure of the inspection system as shown in FIG. 3.

In the present embodiment, as shown in FIGS. 3 and 4, the inspection system comprises a base 1, a boom lifting mechanism 3 provided on the base 1, and a boom 2 mounting a detector. The boom lifting mechanism 3 comprises two support arms, i.e., a base arm 31 and a distal arm 32, and the distal arm 32 is rotatably disposed on the base arm 31. The boom 2 is mounted on the distal arm 32. The distal arm 32 is rotatably disposed on the base arm 31 so that the boom 2 mounted on the distal arm 32 may be at different heights. The structure of the inspection system of the present embodiment is more compact and space-saving.

More preferably, in order to improve the flexibility in the lifting of the boom 2, the base arm 31 is rotatably disposed on the base 1. The base arm 31 is rotatably disposed on the base 1, and the distal arm 32 is also rotatably disposed on the base arm 31 so that the boom 2 may be lifted by respectively controlling a height of the base arm 31 relative to the base 1 and a height of the distal arm 32 relative to the base arm 31.

In an embodiment not shown in the drawings, at least one intermediate support arm may also be provided between the base arm and the distal arm. The intermediate support arm may be provided so that there is a greater lifting range of the boom. Moreover, in order to satisfy the requirements of different heights of the boom, different numbers of intermediate support arms are optional. In addition, various support arms are detachably connected therebetween. In order to further satisfy the requirements of transportation, part of the support arms or all of the support arms may also be removed during transport.

The boom lifting mechanism 3 further comprises a first drive mechanism for driving rotation of the base arm 31 relative to the base 1.

As shown in FIG. 3 and FIG. 4, in the present embodiment, the first drive mechanism comprises a first hydraulic cylinder 33. The cylinder block of the first hydraulic cylinder 33 is connected to the base 1, and the piston rod of the first hydraulic cylinder 33 is connected to the base arm 31. Thus, when the piston rod of the first hydraulic cylinder 33 is moved relative to the cylinder block of the first hydraulic cylinder 33, the base arm 31 is driven to rotate relative to the base 1.

As shown in FIG. 3, the lateral surface of the base 1 is provided with a cylinder block hinge support for arranging the cylinder block of the first cylindrical cylinder 33; the upper end face of the base 1 is provided with a base arm hinge support for arranging the base arm 31, and the bottom end of the base arm 31 is articulated to the base 1 through the base arm hinge support.

The boom lifting mechanism 3 further comprises a second drive mechanism for driving rotation of the distal arm 32.

As shown in FIG. 3 and FIG. 4, in the present embodiment, the second drive mechanism comprises a second hydraulic cylinder 34. The cylinder block of the second hydraulic cylinder 34 is connected to the base arm 31, and the piston rod of the second hydraulic cylinder 34 is connected to the distal arm 32.

As shown in FIG. 3, the distal arm 32 is hinged to an extreme end of the base arm 31.

In an embodiment not shown in the drawings, the cylinder block of the second hydraulic cylinder may also be connected to the base, and the piston rod of the second hydraulic cylinder is connected to the distal arm. The cylinder block of the second hydraulic cylinder is connected to the base, so that the operation of the second hydraulic cylinder is more stable.

In other embodiments not shown in the drawings, the first drive mechanism and the second drive mechanism may be any telescopic mechanism, such as a telescopic pneumatic cylinder or the like.

Preferably, the inspection system comprises a scanning vehicle. The base 1 is disposed on the scanning vehicle. The boom lifting mechanism 3 of the present embodiment may effectuate lifting the boom 2 located at a top end so as to satisfy the height requirements of road travel in a transporting state.

The base 1 may be a revolving platform. The revolving platform is rotatably provided on the scanning vehicle, and the boom lifting mechanism 3 is disposed on the revolving platform. The revolving platform is rotatably provided on the scanning vehicle.

As shown in FIGS. 3 to 6, in the present embodiment, the boom 2 comprises a first detection arm 21 and a second detection arm 22. The second detection arm 22 is rotatably provided on the first detection arm 21. When the inspection system is in the scanning state, the first detection arm 21 is horizontally arranged and the second detection arm 22 is vertically arranged, the boom lifting mechanism 3, the first detection arm 21 and the second detection arm 22 jointly constitute a door-shaped structure provided transversely outside the scanning vehicle as the revolving platform drives the boom lifting mechanism 3 to rotate relative to the scanning vehicle along a first direction so that. When the inspection system is in a transporting state, the second detection arm 22 is in the same direction as the first detection arm 21 by rotation relative to said first detection arm 21, the first detection arm 21 and the second detection arm 22 are both horizontally arranged, and the first detection arm 21 and the second detection arm 22 are disposed longitudinally above the scanning vehicle after said boom lifting mechanism 3 being driven by said revolving platform to rotate relative to the scanning vehicle along a second direction opposite to the first direction.

When the inspection system of the present embodiment is utilized to perform cargo detection, a vehicle carrying a cargo may be made to pass through the door-shaped structure, to accomplish a scanning the cargo.

As shown in FIGS. 3 and 4, when the inspection system of the present embodiment switches into the scanning state, the revolving platform is rotated clockwise so that the boom 2 extends to a transverse outside of the scanning vehicle, and the second detection arm 22 is rotated downwards relative to the first detection arm 21 such that the first detection arm 22, the second detection arm 23 and the boom lifting mechanism 3 jointly constitute a door-shaped structure, to allow that the detected cargo may pass through the door-shaped structure to accomplish the scanning.

Figure 5:
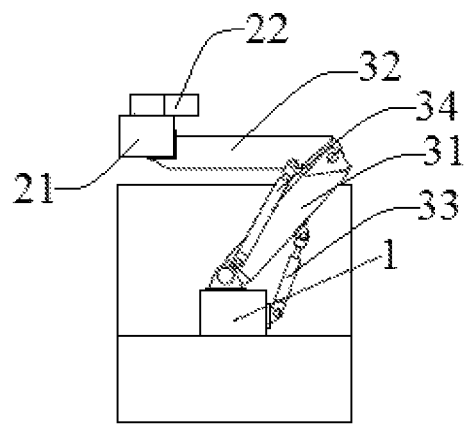
FIG. 5 is a schematic view of a front view structure of the inspection system of the embodiments of the present application in a transporting state.
Figure 6:
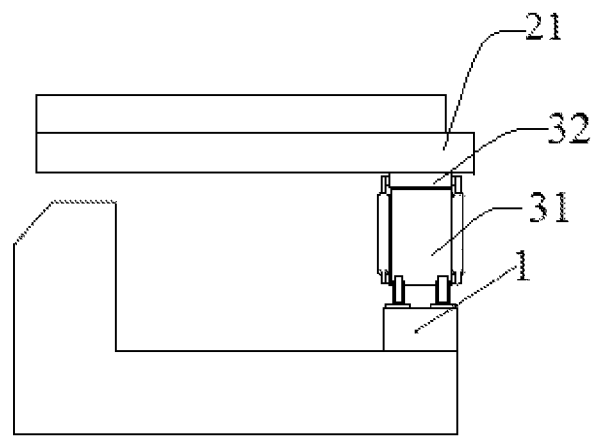
FIG. 6 is a schematic view of the side view mechanism of the inspection system as shown in FIG. 5.

As shown in FIGS. 5 and 6, when the inspection system accomplishes the scanning and needs to switch into the transporting state, the second detection arm 22 is rotated upwards relative to the first detection arm 21 so as to be arranged horizontally, i.e. the second detection arm 22 and the first detection arm 21 are arranged in parallel, and the revolving platform drives the boom lifting mechanism 3 to rotate in a counterclockwise direction so that the boom 2 is located longitudinally above the scanning vehicle. As shown in FIG. 6, the first detection arm 21 and the second detection arm 22 are both retracted to above the scanning vehicle so as to reduce the volume of the inspection system and satisfy the road transport requirements.

Finally, it should be explained that: the aforementioned embodiments are only used to describe the technical solution of the present application rather than limiting the same; although detailed explanations are made to the present application by referring to preferred embodiments, a common technical person in the art should understand that: it is still possible to make amendments to the embodiments of the present application or make equivalent replacements to part of the technical features; without departing from the spirit and scope of the present application, they should all be covered in the scope of the technical solution for which protection is sought in the present application.

The invention claimed is:

1. An inspection system comprising a base, a boom lifting mechanism provided on said base and a detector mounting boom, wherein said boom lifting mechanism comprising at least two support arms arranged sequentially, said at least two support arms comprising a base arm and a distal arm, said base arm being connected to said base, said boom being mounted on said distal arm, said inspection system having a scanning state and a transporting state, two adjacent support arms of the at least two support arms being rotatably connected so that the height of said boom in the scanning state is different from that in the transporting state;

wherein said boom comprising a first detection arm and a second detection arm rotatably provided on said first detection arm;

wherein when said inspection system is in the scanning state, said first detection arm is horizontally arranged and said second detection arm is vertically arranged, and said boom lifting mechanism, said first detection arm and said second detection arm jointly constituting a door-shaped structure; and wherein when said inspection system is in the transporting state, said second detection arm is in the same direction as said first detection arm by rotation relative to said first detection arm, and said first detection arm and said second detection arm are both horizontally arranged.

2. The inspection system according to claim 1, wherein said base arm is rotatably disposed on said base.

3. The inspection system according to claim 2, wherein said boom lifting mechanism comprises a first drive mechanism for driving said base arm to rotate relative to said base.

4. The inspection system according to claim 3, wherein said first drive mechanism comprises a first hydraulic cylinder, one of the cylinder block and the piston rod of said first hydraulic cylinder being connected to said base, the other one of the cylinder block and the piston rod of said first hydraulic cylinder being connected to said base arm.

5. The inspection system according to claim 1, wherein said distal arm is rotatably disposed on said base arm.

6. The inspection system according to claim 5, wherein said boom lifting mechanism comprises a second drive mechanism for driving said distal arm to rotate.

7. The inspection system according to claim 6, wherein said second drive mechanism comprises a second hydraulic cylinder, one of the cylinder block and the piston rod of said second hydraulic cylinder being connected to said base arm or said base, the other one of the cylinder block and the piston rod of said second hydraulic cylinder being connected to said distal arm.

8. The inspection system according to claim 1, further comprising a scanning vehicle on which said base is disposed.

9. The inspection system according to claim 8, wherein said base comprising a revolving platform rotatably provided on said scanning vehicle, said boom lifting mechanism being disposed on said revolving platform.

10. The inspection system according to claim 9,
wherein when said inspection system is in the scanning state, said first detection arm is horizontally arranged and said second detection arm is vertically arranged, and said boom lifting mechanism, said first detection arm and said second detection arm jointly constitute a door-shaped structure provided transversely outside the scanning vehicle as said revolving platform drives said boom lifting mechanism to rotate relative to said scanning vehicle along a first direction; and when said inspection system is in the transporting state, said second detection arm is folded in the same direction as said first detection arm by rotation relative to said first detection arm, and said first detection arm and said second detection arm are both horizontally arranged, said first detection arm and said second detection arm are disposed longitudinally above said scanning vehicle after said boom lifting mechanism being driven by said revolving platform to rotate relative to said scanning vehicle along a second direction opposite to the first direction.

* * * * *